L. F. CRUMLEY.
TRANSMISSION BAND.
APPLICATION FILED APR. 20, 1921.
1,407,385.
Patented Feb. 21, 1922.
2 SHEETS—SHEET 1.
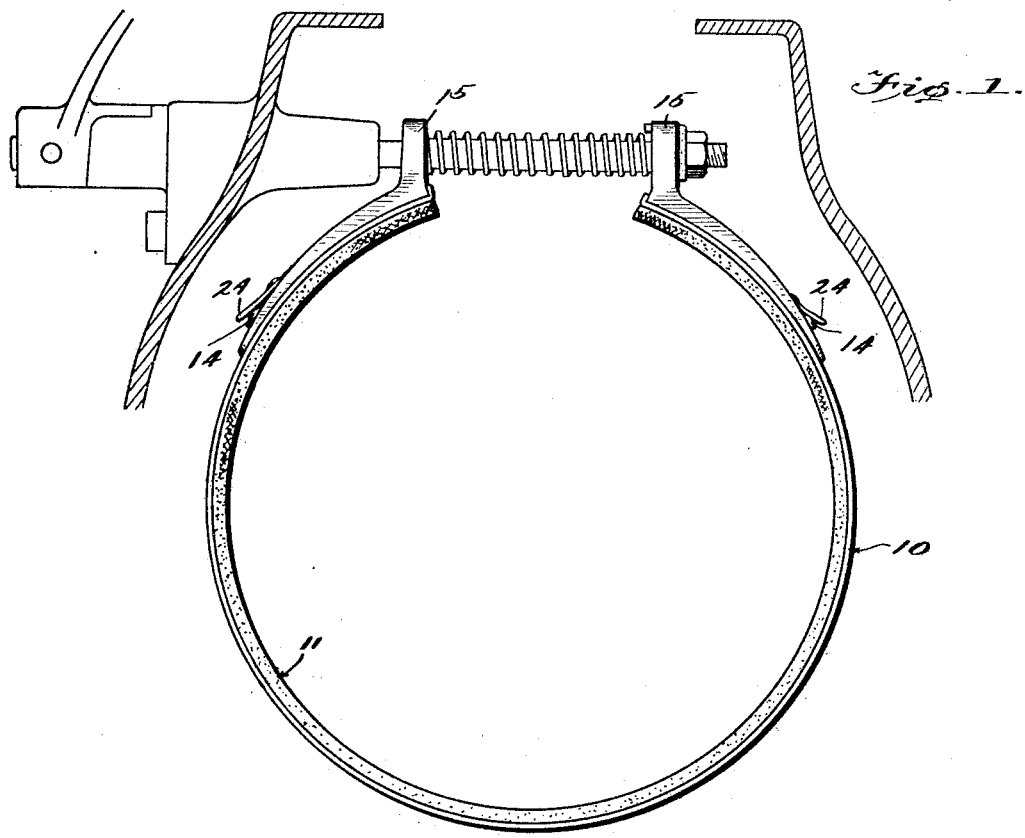
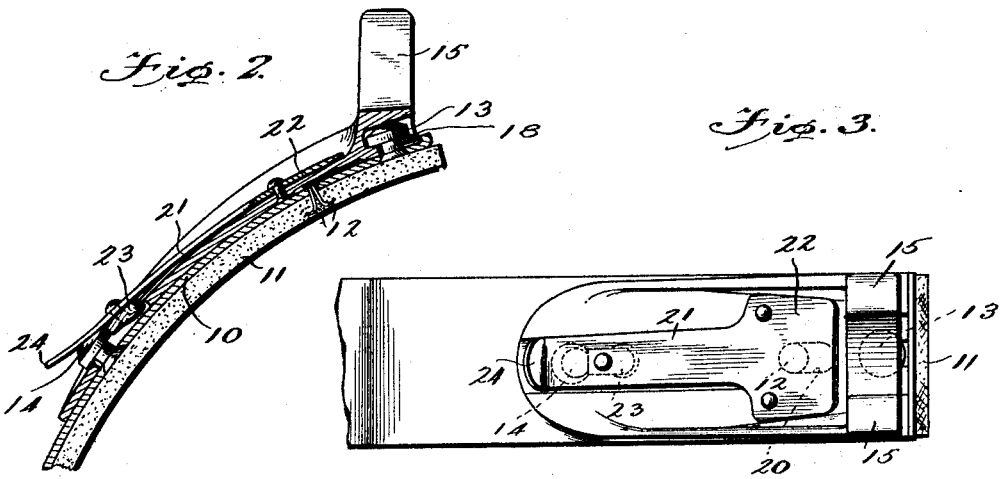
WITNESSES
INVENTOR
L. F. Crumley,
BY
ATTORNEYS

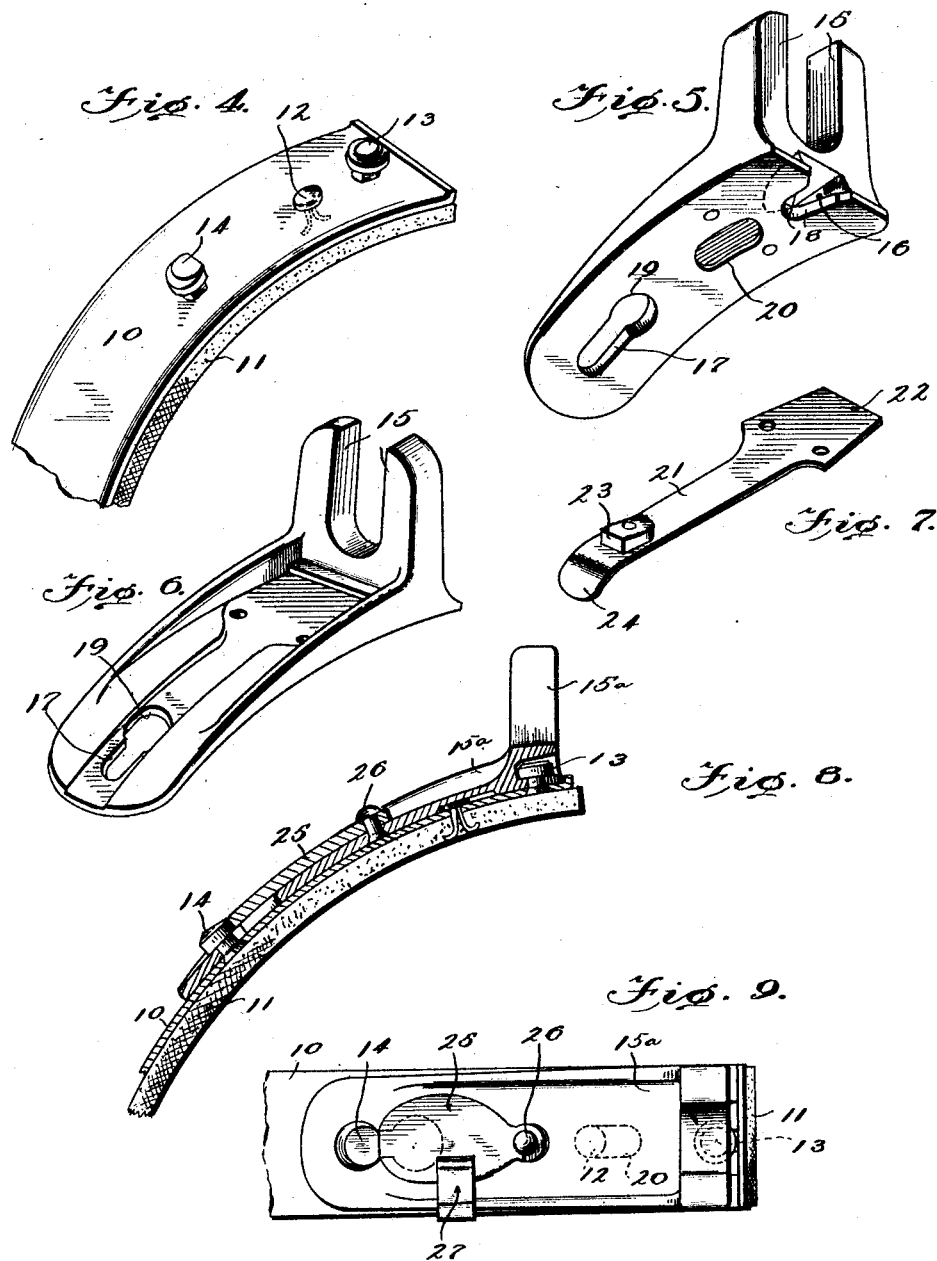

UNITED STATES PATENT OFFICE.

LEONIDAS FRANKLIN CRUMLEY, OF LA FOLLETTE, TENNESSEE.

TRANSMISSION BAND.

1,407,385.  Specification of Letters Patent.  Patented Feb. 21, 1922.

Application filed April 20, 1921. Serial No. 462,847.

*To all whom it may concern:*

Be it known that I, LEONIDAS FRANKLIN CRUMLEY, a citizen of the United States, and a resident of La Follette, in the county of Campbell and State of Tennessee, have invented certain new and useful Improvements in Transmission Bands, of which the following is a specification.

My present invention relates generally to transmission bands for certain well known automobiles whose gripping function necessitates replacement of the friction linings from time to time and whose lugs as most commonly constructed are either non-removable with respect to the clutch band or, if removable, as has been proposed, subject the band to a chattering or undesirable vibration in use and frequently become accidentally displaced.

It is the object of my invention to provide a removable construction in which both accidental displacement and the above mentioned undesirable chattering or vibration will be eliminated while ready removal of the band or relining is permitted.

In the accompanying drawings illustrating my invention and forming a part of this specification, Figure 1 is a sectional side view illustrating the practical application of my invention, Figure 2 is a section taken lengthwise through one end of the band and through my improved lug thereon, Figure 3 is a top plan view of the parts shown in Figure 2, Figure 4 is a detail perspective view of one end of the band with the lug removed, Figures 5 and 6 are detail perspective views of the lug removed respectively looking at the lower and upper surfaces thereof, Figure 7 is a detail perspective view of the locking spring and its locking piece, Figure 8 is a section taken lengthwise through one end of the band and a lug thereon showing a slightly modified construction, and Figure 9 is a top plan view of the parts shown in Figure 8.

Referring now to these figures I have shown in Figure 1 a transmission band 10 having the usual friction lining 11 attached thereto by means of rivets certain of which appear at 12 in Figures 2, 4 and 8, this band being in accordance with my invention provided at its ends with lengthwise spaced outstanding studs 13 and 14, the former located close to the extremity of the band. Both of these studs have enlarged outer heads and have shanks either square or provided with flattened sides.

The lugs 15 for the band ends are of the usual form as a whole but, in accordance with my invention are provided with means to engage the studs 13 and 14 as well as means for detachably locking them in such engagement, and each is provided to this end with inner stud engaging openings 16 and 17, the former of which, located at the outer shouldered end of the lug, is in the nature of an undercut slot whose inner bordering shoulders 18 are spaced apart a distance corresponding to the thickness of the shank of stud 13 and are gradually thickened from the extreme end of the lug as shown in Figure 2 so that the stud 13 will not only be engaged at its sides, but the side portions of the head of the stud will likewise be engaged and the extreme outer end of the lug 15 will be firmly bound against the outer surface of the band 10 adjacent to its respective end so as to avoid all danger of chattering or undesirable vibration to which detachable lugs are now subject.

The other opening 17 of each lug, to receive the stud 14, is in the form of a key hole slot through the larger end 19 of which the head of stud 14 is adapted to be projected so that the shank of stud 14 will be engaged between the properly spaced side portions of the slot 17 when the lug is shifted outwardly to properly engage the stud 13 in its undercut end slot 16.

Each lug 15 is also provided between its stud engaging openings 16 and 17 with a longitudinally elongated recess 20 adapted to removably receive the head of one of the rivets 12 holding the lining 11 in place.

The foregoing structure is true of both forms of the invention, while that form illustrated in Figures 1 to 7 inclusive contemplates a locking means consisting of a flat spring 21, one enlarged end 22 of which is riveted to the upper surface of lug 15 adjacent to the shouldered end of the latter, and the opposite free end of which carries a depending locking stud 23 within the enlarged end 19 of the key hole slot 17 so as to slip into place forwardly of the stud 14 when the latter is shifted into the rear narrow portion of the slot as seen in Figure 2. For this purpose the stud 23 of the spring preferably tapers in a direction away from the free end of the spring and the upper surface of the head of stud 14 likewise tapers so that while capable of effective locking, release of the locking stud 23 may be readily accomplished.

As the lug is placed in the first instance, the pressure of the same downwardly against the outer surface of the band 10 forces the head of the band stud 14 upwardly through the large end 19 of the key hole slot, which presses the locking stud 23 upwardly against the tension of spring 21 and as the lug 15 is shifted to the properly engaged position of Figure 2 the locking stud 23 will drop into the slot 17 in the space in advance of stud 14. Thus the locking action is automatic and positive while for release the only thing that is required is a slight lifting of the free end of spring 21 which may be readily accomplished particularly as this free end is upturned slightly as seen at 24 in Figures 1, 2 and 7.

In the form of construction shown in Figures 8 and 9 the spring 21 with its locking stud is dispensed with and a swinging locking piece 25 is pivoted at one end as at 26 to the lug 15ª so that its free end may be shifted into and out of engagement with the head of stud 14 of the band when the latter is at the smaller end of the key hole slot 14, the lug 15ª having at one end a spring clasp 27 beneath which the locking piece 25 is swung when lockingly engaged with stud 14 so as to thus hold the swinging piece against accidental displacement.

It is clear from the foregoing that it becomes a ready simple matter to disengage the band 10 from its lugs, when replacement of lining 11 becomes desirable or necessary and that the relining operation will be greatly simplified by this fact and rendered much easier particularly in the hands of those having no particular skill or preparation for such work.

I claim:

1. A transmission band having lengthwise spaced outstanding studs one of which is located adjacent to its extremity, a lug having openings to receive the said studs, one of which openings is in the nature of an undercut slot entering the lug at its shouldered end, said studs having heads and said lug having tapering shoulders along its said undercut slot engageable beneath the head of one of the studs, and means carried by the lug and engageable with the other stud to removably lock the lug in connection therewith.

2. A transmission band having lengthwise spaced studs outstanding therefrom and provided with flat faced shanks and heads, a lug having openings to receive the studs, one of which is in the nature of an undercut slot entering the shouldered end of the lug and the other of which is in the nature of a key hole slot, and means mounted on the lug and engageable with a stud in the key hole slot to removably lock the lug in place.

3. A transmission band having lengthwise spaced studs outstanding therefrom and provided with flat faced shanks and heads, a lug having openings to receive the studs, one of which is in the nature of an undercut slot entering the shouldered end of the lug and the other of which is in the nature of a key hole slot, and means mounted on the lug and engageable with a stud in the key hole slot to removably lock the lug in place including a spring controlled locking member shiftable into and out of a portion of the key hole slot.

4. A transmission band having lengthwise spaced studs outstanding therefrom and provided with flat faced shanks and heads, a lug having openings to receive the studs, one of which is in the nature of an undercut slot entering the shouldered end of the lug and the other of which is in the nature of a key hole slot, and means mounted on the lug and engageable with a stud in the key hole slot to removably lock the lug in place including a spring controlled locking member shiftable into and out of a portion of the key hole slot, said stud entering the key hole slot and said locking member having cooperating inclined surfaces as described.

5. A transmission band having lengthwise spaced lugs, a lug having stud receiving openings and shiftable in the direction of the length of the band to project the studs thereof into the openings, a locking stud for movement into one of the openings in engagement with one of the studs to prevent lengthwise movement of the lug, and a spring secured to the lug and carrying the said locking stud with which the latter is yieldable into and out of active position.

LEONIDAS FRANKLIN CRUMLEY.